United States Patent
Riegle et al.

(10) Patent No.: US 11,461,916 B2
(45) Date of Patent: Oct. 4, 2022

(54) METHODS AND SYSTEMS FOR RECOGNIZING GEOMETRIC UNITS IN A COMPUTER IMAGE

(71) Applicants: Christopher Riegle, Cary, NC (US); Oleksandr Volodymyrovych Tyshchenko, Kremenchuck (UA)

(72) Inventors: Christopher Riegle, Cary, NC (US); Oleksandr Volodymyrovych Tyshchenko, Kremenchuck (UA)

(73) Assignee: Pixis Consulting, LLC, Morrisville, NC (US)

( * ) Notice: Subject to any disclaimer, the term of this patent is extended or adjusted under 35 U.S.C. 154(b) by 0 days.

(21) Appl. No.: 17/252,396

(22) PCT Filed: Jun. 17, 2019

(86) PCT No.: PCT/US2019/037464
§ 371 (c)(1),
(2) Date: Dec. 15, 2020

(87) PCT Pub. No.: WO2019/241771
PCT Pub. Date: Dec. 19, 2019

(65) Prior Publication Data
US 2021/0192767 A1  Jun. 24, 2021

Related U.S. Application Data

(60) Provisional application No. 62/685,324, filed on Jun. 15, 2018.

(51) Int. Cl.
*G06K 9/00* (2022.01)
*G06T 7/62* (2017.01)
(Continued)

(52) U.S. Cl.
CPC .............. *G06T 7/62* (2017.01); *G06V 10/462* (2022.01); *G06V 10/751* (2022.01)

(58) Field of Classification Search
CPC ......... G06F 30/13; G06T 11/60; G06T 17/05; G06T 7/13; G06T 19/00; G06T 7/70;
(Continued)

(56) References Cited

U.S. PATENT DOCUMENTS 8,849,030 B2   9/2014  Wang et al.
9,367,737 B2   6/2016  Chen et al.
(Continued)

FOREIGN PATENT DOCUMENTS

CN   106210696    * 12/2016
WO   2012016242 A2   2/2012
(Continued)

OTHER PUBLICATIONS

Lu et al. (Image classification by visual bag-of-words refinement and reduction) Jan. 2015 (Year: 2015).*
(Continued)

*Primary Examiner* — Quan M Hua
(74) *Attorney, Agent, or Firm* — Olive Law Group, PLLC

(57) ABSTRACT

Methods and systems for recognition of repeating geometric units in a computer image are here disclosed. According to an aspect, a representation of a computer image is split into components and every component is analyzed to identify the role of this component on the computer image. Identified components could include but are not limited to: rooms, doors, furniture etc. In one embodiment components are identified based on the presence or absence of at least one other component. The presence of a door, in a non-limiting example, could be used to denote the presence of a room. In a further embodiment, the program may extract size and
(Continued)

perimeter information necessary for estimating needed materials from a representation of a computer image.

20 Claims, 20 Drawing Sheets

(51) Int. Cl.
*G06V 10/46* (2022.01)
*G06V 10/75* (2022.01)

(58) Field of Classification Search
CPC ... G06T 11/00; G06T 19/006; G06T 2200/24; G06T 1/60; G06T 2207/10016; G06T 2207/20132; G06T 2207/20212; G06T 2207/30168; G06T 2210/04; G06T 3/0006; G06T 3/0062; G06T 3/4038; G06T 5/002; G06T 5/50; G06K 9/00; G06K 9/6256; G06K 9/627
See application file for complete search history.

(56) References Cited

U.S. PATENT DOCUMENTS

| | | | |
|---|---|---|---|
| 2015/0131871 A1* | 5/2015 | Chen | G06T 5/002 382/113 |
| 2019/0072395 A1* | 3/2019 | Namboodiri | G06F 30/13 |
| 2019/0130233 A1* | 5/2019 | Stenger | G06V 30/274 |
| 2019/0266293 A1* | 8/2019 | Ishida | G06F 30/00 |

FOREIGN PATENT DOCUMENTS

| | | | |
|---|---|---|---|
| WO | WO-2012016242 A2 * | 2/2012 | ......... G06K 9/00147 |
| WO | 2019241771 A1 | 12/2019 | |

OTHER PUBLICATIONS

Barnwal—Union-Find Algorithm | Set | (Detect Cycle in a Graph) (Year: 2018).*
Notification of Transmittal and International Search Report for related application PCT/US2019/037464 dated Jul. 26, 2019 (5 pages).
Written Opinion of the International Searching Authority for related application PCT/US2019/037464 dated Jul. 26, 2019 (5 pages).
Notification concerning publication of related application PCT/US2019/037464 dated Dec. 19, 2019 (1 page).
International Preliminary Report on Patentability issued by the international Bureau of WIPO for related application PCT/US2019/037464 dated Dec. 15, 2020 (six pages).
Wu, K., et al. "Optimizing connected component labeling algorithms." Proc. SPIE 5747, Medical Imaging, Apr. 29, 2005, San Diego; California, United States.
"Union-Find Algorithm | Set 1 (Detect Cycle in a Graph)" URL:<http://web.archive.org/web/20130102080243/http://www.geeksforgeeks.org/union-find/> [Cannot Locate Reference].

* cited by examiner

METHODS AND SYSTEMS FOR RECOGNIZING GEOMETRIC UNITS IN A COMPUTER IMAGE

CROSS REFERENCE TO RELATED APPLICATION

This is a 371 national stage application, which claims priority to PCT International Patent Application No. PCT/US2019/037464, filed Jun. 17, 2019, and titled METHODS AND SYSTEMS FOR RECOGNIZING ROOMS, which claims priority to U.S. Provisional Patent Application No. 62/685,324, filed on Jun. 15, 2018, and titled METHODS AND SYSTEMS FOR RECOGNIZING ROOMS, the disclosures of which are incorporated herein by reference in their entireties.

TECHNICAL FIELD

The present application relates to computer imaging specifically recognizing rooms or other geometric units in a computer image, and related methods.

BACKGROUND

Computers are currently incapable of recognizing rooms, doorways, windows, or other repeating geometric structures. Most imaging programs deal with this issue by having the user trace the perimeter of the room, window, doorway or other repeating geometric units using a mouse or other computer input device. This of course takes time, which depending on the number of images involved, can stretch into hours.

This computer imaging problem is particularly acute in the construction industry. Whenever a building's interior is to be changed, an accurate determination of floorspace is required, otherwise, more floor covering than necessary would be ordered. As floorspace covered by walls is not carpeted accurate, recognition of walls by the computer calculating floorspace is critical.

In view of the foregoing, there is a need for a computer system that can quickly recognize the precise dimensions of a room, door, window, or other repeating geometric unit in a computer image.

SUMMARY

This summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Disclosed herein are systems and methods for recognition of repeating geometric units in a computer image. According to an aspect, a method includes identifying potential repeating geometric units using a connected component labeling algorithm, selecting potential repeating geometric units using a rule set, detecting breaks in a perimeter of potential repeating geometric units, and identifying all potential features in the potential repeating geometric unit perimeter breaks. The method also includes identifying specific feature points by comparing key point descriptors and using a rule set.

According to another aspect, a repeating geometric unit recognizing system includes a computing device having an architectural analyzer configured to identify potential repeating geometric units using a connected component labeling algorithm, select potential repeating geometric units using a rule set, detect breaks in a perimeter of potential repeating geometric units, and identify all potential features in the potential repeating geometric unit perimeter break. The system also includes the architectural analyzer being confirmed to identify specific feature points by comparing key point descriptors using a rule set.

In another aspect of the present disclosure a computer program product comprising a non-transitory computer readable medium having program code embedded thereto, the program code being configured to identify potential repeating geometric units using a connected component labeling algorithm, select potential repeating geometric units using a rule set, detect breaks in a perimeter of potential repeating geometric units, and identify all potential features in the potential repeating geometric unit perimeter break. Further, the program code may be configured to identify specific feature points by comparing key point descriptors and using a rule set.

BRIEF DESCRIPTION OF THE DRAWINGS

The foregoing summary, as well as the following detailed description of various embodiments, is better understood when read in conjunction with the appended drawings. For the purposes of illustration, there is shown in the drawings' exemplary embodiments; however, the presently disclosed subject matter is not limited to the specific methods and instrumentalities disclosed. In the drawings.

DETAILED DESCRIPTION

Figure 1:
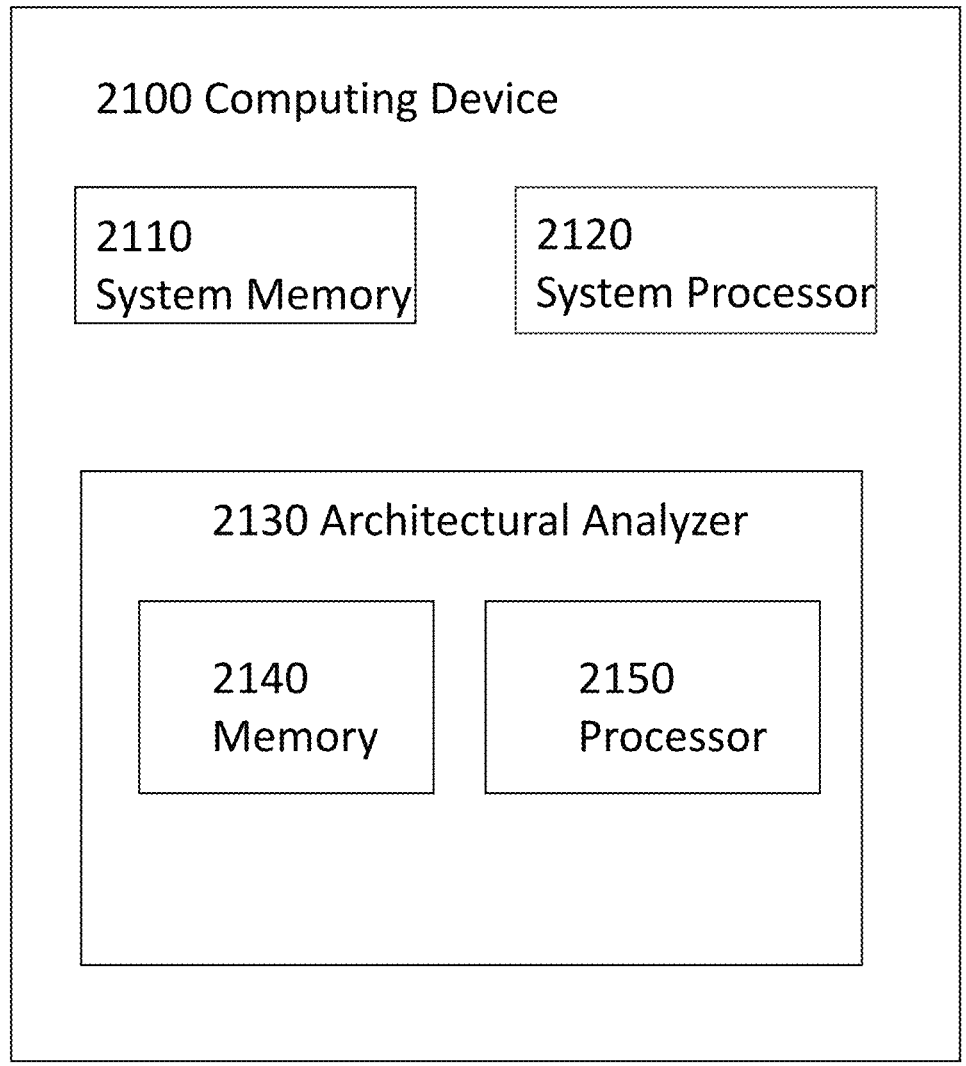
FIG. 1 is a block diagram of an example system for recognizing repeating geometric units in a computer image according to an embodiment of the present disclosure.

For the purposes of promoting an understanding of the principles of the present disclosure, reference will not be made to various embodiments, and specific language will be used to describe the same. It will nevertheless be understood that no limitation of the scope of the disclosure is thereby intended, such alteration and further modifications of the disclosure is thereby intended, such alteration and further modifications of the disclosure as illustrated herein, being contemplated as would normally occur to one skilled in the art to which the disclosure relates.

Articles "a" and "an" are used herein to refer to one or more than one (i.e. at least one) of the grammatical object of the article. By way of example "an element" means at least one element and can include more than one element.

In this disclosure, "comprises," "comprising," "containing" and "having" and the like can have the meaning ascribed to them in U.S. Patent law and can mean "includes," "including," and the like; "consisting essentially of" or "consists essentially" likewise has the meaning ascribed in U.S. Patent law and the term is open-ended, allowing for the presence of more than that which is recited so long as basic or novel characteristics of that which is recited is not changed by the presence of more than that which is recited, but excludes prior art embodiments.

Unless otherwise defined, all technical terms used herein have the same meaning as commonly understood by one of ordinary skill in the art to which this disclosure belongs.

As referred to herein, the term "computing device" should be broadly construed. It can include any type of device including hardware, software, firmware, the like, and combinations thereof. A computing device may include one or more processors and memory or other suitable non-transitory, computer readable storage medium having computer readable program code for implementing methods in accordance with embodiments of the present invention. In another example, a computing device may be a server or other computer and communicatively connected to other computing devices (e.g., handheld devices or computers) for data analysis. In another example, a computing device may be a mobile computing device such as, for example, but not limited to, a smart phone, a cell phone, a pager, a personal digital assistant (PDA), a mobile computer with a smart phone client, or the like. In another example, a computing device may be any type of wearable computer, such as a computer with a head-mounted display (HMD). A computing device can also include any type of conventional computer, for example, a laptop computer or a tablet computer. A typical mobile computing device is a wireless data access-senabled device (e.g., an iPHONE® smart phone, a BLACKBERRY® smart phone, a NEXUS ONE™ smart phone, an iPAD® device, or the like) that is capable of sending and receiving data in a wireless manner using protocols like the Internet Protocol, or IP, and the wireless application protocol, or WAP. This allows users to access information via wireless devices, such as smart phones, mobile phones, pagers, two-way radios, communicators, and the like. Wireless data access is supported by many wireless networks, including, but not limited to, CDPD, CDMA, GSM, PDC, PHS, TDMA, FLEX, ReFLEX, iDEN, TETRA, DECT, DataTAC, Mobitex, EDGE and other 2G, 3G, 4G and LTE technologies, and it operates with many handheld device operating systems, such as PalmOS, EPOC, Windows CE, FLEXOS, OS/9, JavaOS, iOS and Android. Typically, these devices use graphical displays and can access the Internet (or other communications network) on so-called mini- or microbrowsers, which are web browsers with small file sizes that can accommodate the reduced memory constraints of wireless networks. In a representative embodiment, the mobile device is a cellular telephone or smart phone that operates over GPRS (General Packet Radio Services), which is a data technology for GSM networks. In addition to a conventional voice communication, a given mobile device can communicate with another such device via many different types of message transfer techniques, including SMS (short message service), enhanced SMS (EMS), multi-media message (MMS), email WAP, paging, or other known or later-developed wireless data formats. Although many of the examples provided herein are implemented on smart phone, the examples may similarly be implemented on any suitable computing device, such as a computer.

As referred to herein, the term "user interface" is generally a system by which users interact with a computing device. A user interface can include an input for allowing users to manipulate a computing device, and can include an output for allowing the computing device to present information and/or data, indicate the effects of the user's manipulation, etc. An example of a user interface on a computing device includes a graphical user interface (GUI) that allows users to interact with programs or applications in more ways than typing. A GUI typically can offer display objects, and visual indicators, as opposed to text-based interfaces, typed command labels or text navigation to represent information and actions available to a user. For example, a user interface can be a display window or display object, which is selectable by a user of a computing device for interaction. The display object can be displayed on a display screen of a computing device and can be selected by and interacted with by a user using the user interface. In an example, the display of the computing device can be a touch screen, which can display the display icon. The user can depress the area of the display screen where the display icon is displayed for selecting the display icon. In another example, the user can use any other suitable user interface of a computing device, such as a keypad, to select the display icon or display object. For example, the user can use a track ball or arrow keys for moving a cursor to highlight and select the display object.

Operating environments in which embodiments of the present disclosure may be implemented are also well known. In a representative embodiment a mobile electronic device, such an e-book reader, is connectable (for example, via WAP) to a transmission functionality that varies depending on implementation. Thus, for example, where the operating environment is a wide area wireless network (e.g. a 2.5G network, a 3G network, or a 4G network), the transmission functionality comprises one or more components such as a mobile switching center (MSC) (an enhanced ISDN switch that is responsible for call handling of mobile subscribers), a visitor location register (VLR) (an intelligent database that stores on a temporary basis data required to handle calls set up or received by mobile devices registered with the VLR), a home location register (HLR) (an intelligent database responsible for management of each subscriber's records), one or more base stations (which provide radio coverage with a cell), a base station controller (BSC) (a switch that acts as a local concentrator of traffic and provides local switching to effect handover between base stations), and a packet control unit (PCU) (a device that separates data traffic coming from a mobile device). The HLR also controls certain services associated with incoming calls. Of course, embodiments in accordance with the present disclosure may be implemented in other and next generation mobile networks and devices as well. The mobile device is the physical equipment used by the end user, typically a subscriber to the wireless network. Typically, a mobile device is a 2.5G compliant device, 3G compliant device, a 4G compliant device, or a 5G compliant device that includes a subscriber identity module (SIM), which is a smartcard that carries subscriber specific information, mobile equipment (e.g. radio and associated signal processing devices), a user interface (or a man machine interface (MMI)); and one or more interfaces to external devices (e.g., computers, tablets, smartphones, tablets, PDAs and the like). The electronic device may also include a memory or data store.

The presently disclosed subject matter provides a repeating geometric unit recognition system that can recognize repeating geometric units such as rooms in a computer image. The system can remove all human room or other repeating geometric unit recognition from computer image analysis. In an example use, a user can provide computer images of any amount to the system and the system recognizes rooms or other repeating geometric units. The image can then be further analyzed, for example floor space could be calculated, as needed.

A repeating geometric unit recognition system in accordance with the present disclosure may provide a user interface. The user interface may be operably configured with a device as described herein. The user interface may include a display. The user interface may outline rooms on the provided computer image.

FIG. 1 shows a general outline of system components. A computing device 2100 consisting of system memory 2110 and a system processor 2120, may connect with an architectural analyzer 2130. In an embodiment the architectural analyzer may comprise memory 2140 and a processor 2150. In an embodiment the architectural analyzer 2130 may use the system processor 2120 and system memory 2110.

Figure 2:
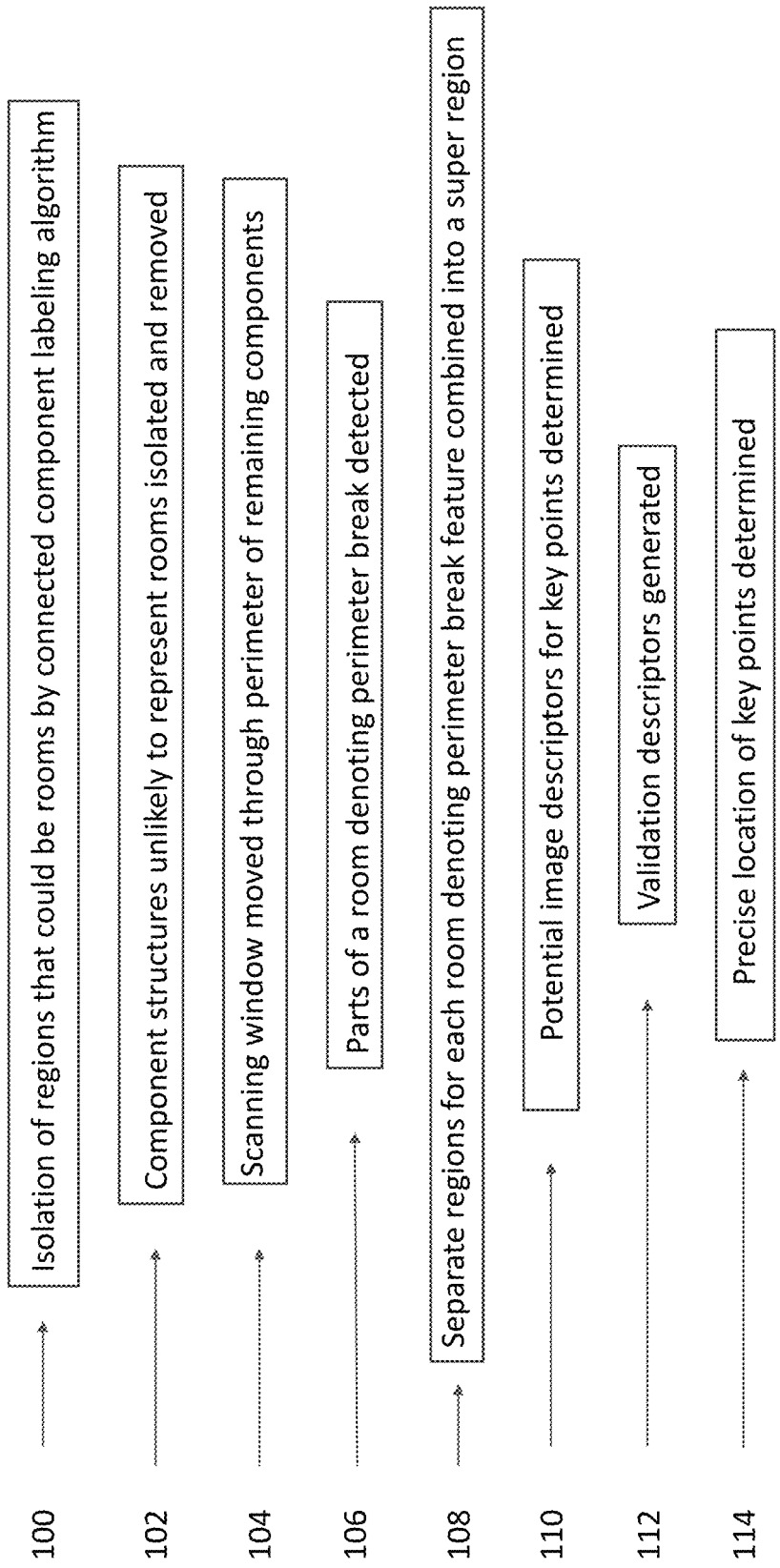
FIG. 2 is a flow chart illustrating the basic steps of the system according to an embodiment of the present disclosure.
Figure 3:
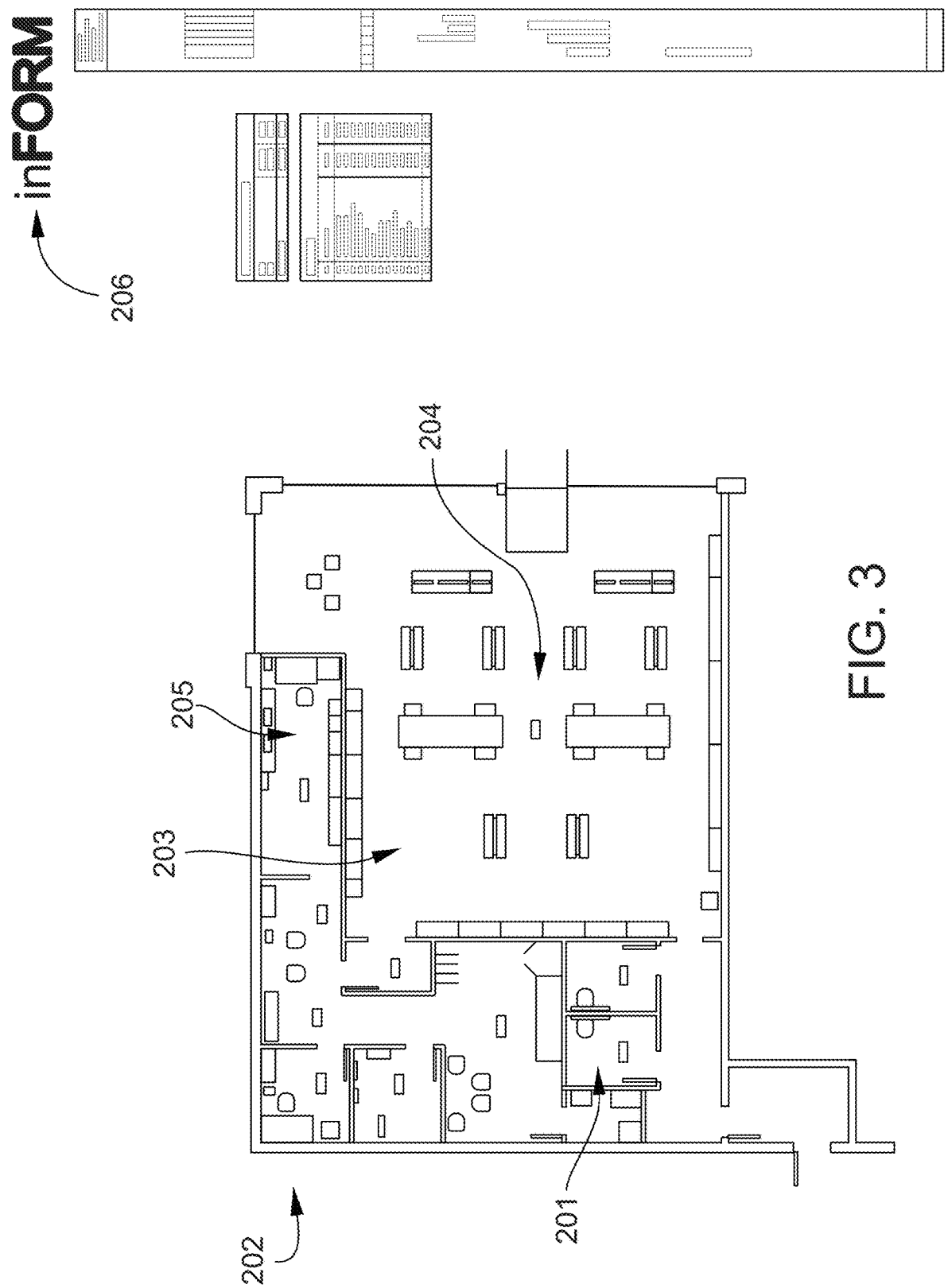
FIG. 3 is a depiction of several possible connected components according to an embodiment of the present disclosure.

FIG. 2 is a flow chart illustrating the basic steps of the system according to an embodiment of the present disclosure. In step 100, a connected component algorithm may isolate regions of a computer image that could be geometric units. The selected algorithm may use a decision tree to reduce the number of neighboring pixels visited and a compact representation of the union-find data structure to reduce computational time. Connected component algorithms isolate smaller parts of a larger whole. In the imaging context, areas of continuous pixel connection are isolated. Each isolated connected component consists of uninterrupted pixel chains. Thus, each isolated connected component could be completely traced by a pencil with a pixel sized point without removing the point from the image or tracing a section outside the isolated connected component. Several example connected components can be seen in FIG. 3. A connected component could identify a room 201, but it could also identify an entire floor 202, furniture 203, an engineering designation 204, a letter inside the floorplan 205, or a letter outside the floorplan 206. According to embodiments of the present disclosure, connected components will refer to rooms 201, entire floors 202, furniture 203, engineering designations 204, letters inside floorplans, letters outside the floorplan, or any other uninterrupted pixel chain in a computer image.

Figure 4:
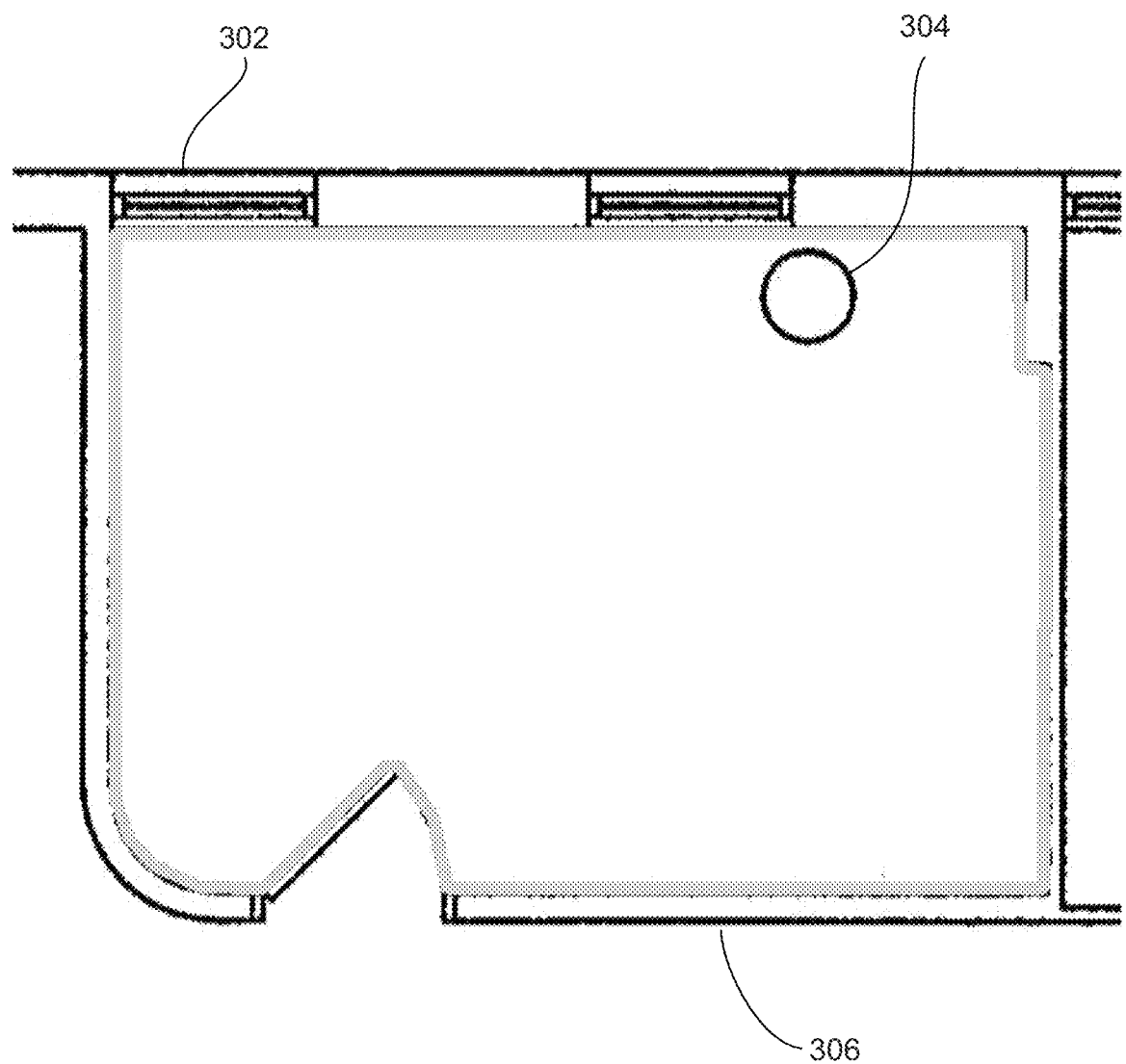
FIG. 4 is a diagram illustrating the architecture analyzer in the process of determining the presence of a connected component according to an embodiment of the present disclosure.

In one embodiment of the current disclosure, the connected component algorithm could initially isolate thousands of such connected components. In 102, the component labeling algorithm may identify various component structures that are unlikely to represent a room or other desired geometric unit. For instance component structures that: (1) reside on the edge of an entire image (such components are likely to be wells, tables or just the blank areas of the image); (2) overlap with larger components; and/or (3) are measured at a size that is smaller than previously measured components are preferably removed from the labeling output. In an alternate embodiment of the present disclosure, one door or other room denoting perimeter break could be outlined by the user. Thus, an estimated room denoting perimeter break area is calculated. Further, areas smaller than 1.5 times the estimated room denoting perimeter break area may be removed from the labeling output in step 2. As would be obvious to one of ordinary skill in the art, other size windows are possible. An example of a connected component which could be a room isolated after other component structures have been removed using a rule set is shown in FIG. 4. In FIG. 4, 306 represents the outline of the connected component generated by the system, 302 represents windows, and 304 represents furniture.

Figure 5:
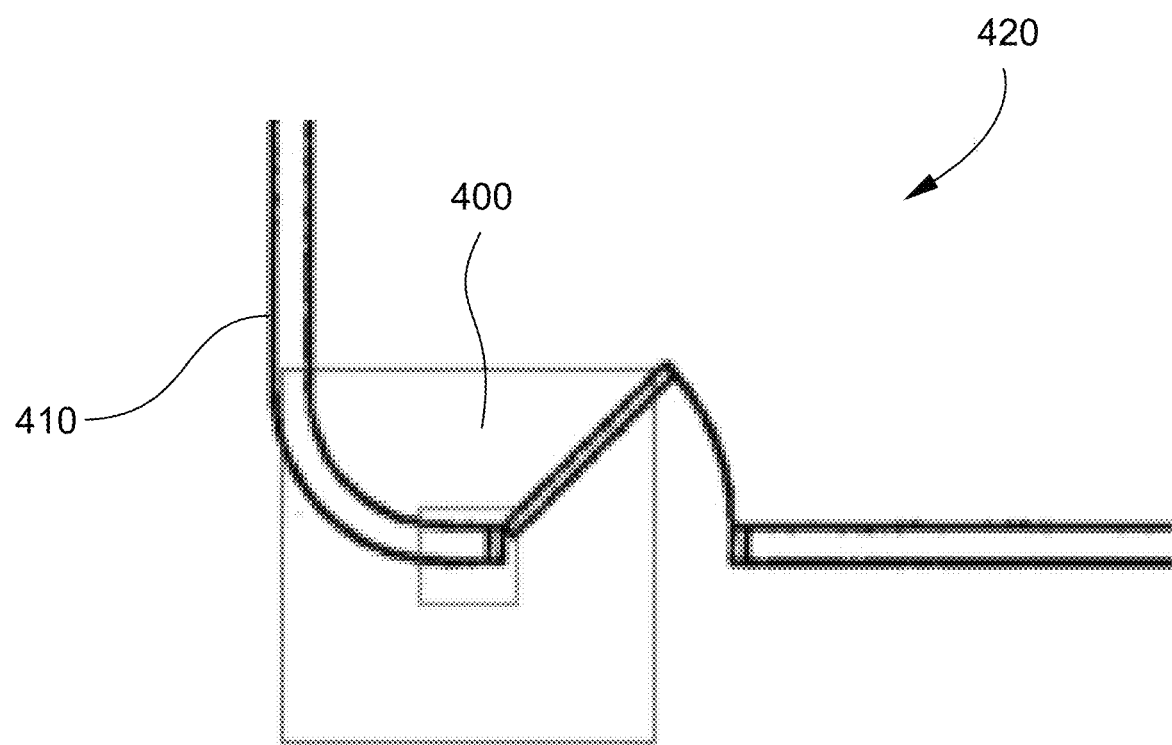
FIG. 5 is a diagram illustrating the scanning window in the process of scanning the perimeter of a potential room in an embodiment of the present disclosure.
Figure 6:
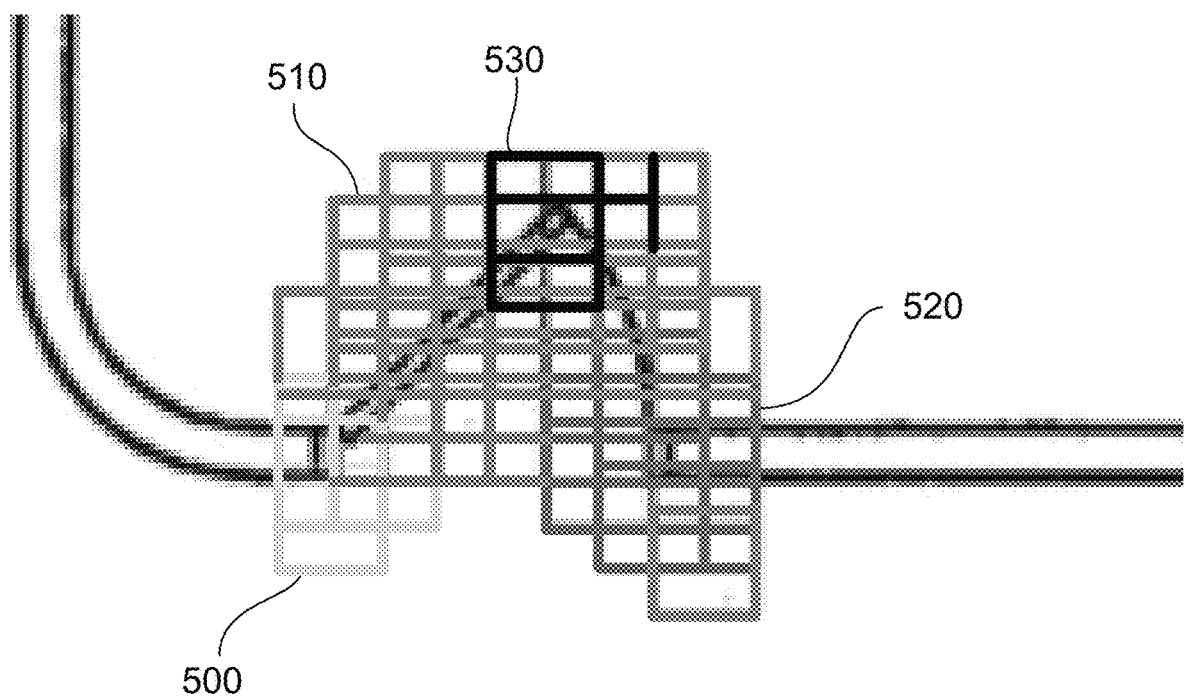
FIG. 6 is a diagram illustrating room denoting open space part labeling by the bag of words algorithm in computer vision according to an embodiment of the present disclosure.
Figure 7:
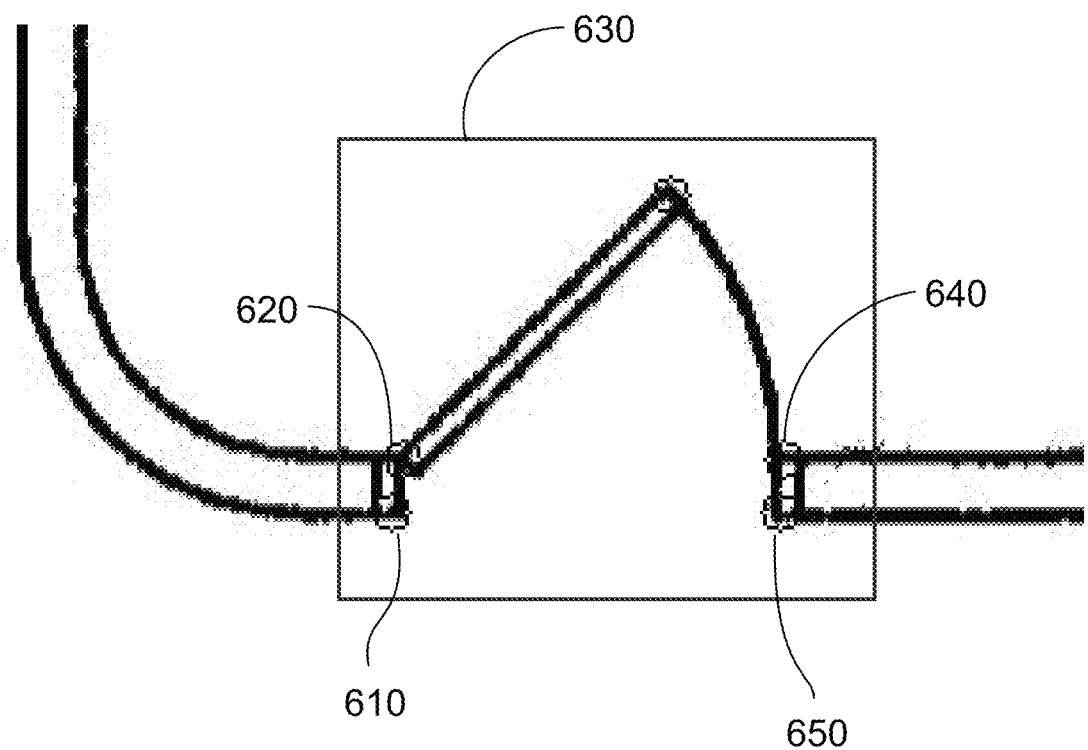
FIG. 7 is a diagram illustrating a room denoting open space labeled by the bag of words algorithm in computer vision according to an embodiment of the present disclosure.

Now turning to FIG. 5, in an embodiment tailored for room detection, room denoting perimeter breaks could be used to definitively separate rooms from other components. As further shown in FIG. 5, a scanning window 400 may be moved through the perimeter 410 of the connected component 420. Next, in step 106 as outlined in FIG. 2, the classifier based on a bag of words model may detect, in an embodiment tailored for room detection, parts of a room denoting perimeter break as shown in FIG. 6. The bag of words algorithm may detect repetitive key point constructions within the scanning window. A helpful, but non limiting, metaphor is to think of the repetitive image construction as words. If the repetitive image construction are words, the area within the scanning window can be considered a sentence. In one embodiment of the present disclosure, four bag of words discriminative classifiers may be created using Support Vector Machine (SVM) models. At least one discriminative classifier may be generated for a first casing 500, a second casing 510, the furthest part of the door 520, and the remaining body of the doorway 530. Image descriptors generated by the bag of words algorithm may be checked against each discriminative classifier. Any positive responses may be marked as shown in FIG. 6. As would be obvious to one with skill in the art, multiple types of classification algorithms exist that could be substituted for the SVM training model depending on the amount of training data available.

Still referring to FIG. 6, the preceding steps may generate separate regions containing one or more potential room denoting perimeter break features. These separate regions could then be combined into a super region containing the entire room denoting perimeter break 108. Areas with missing regions are preferably considered false positives and may be removed, unless the missing regions can be recovered. At this point, the precise location of each potential room denoting perimeter break feature is unknown. A perimeter break feature detection algorithm could be used to precisely identify the location of each feature within a room. For instance, as shown in FIG. 8, a perimeter break feature detection algorithm generates feature descriptors for the super region.

Figure 8:
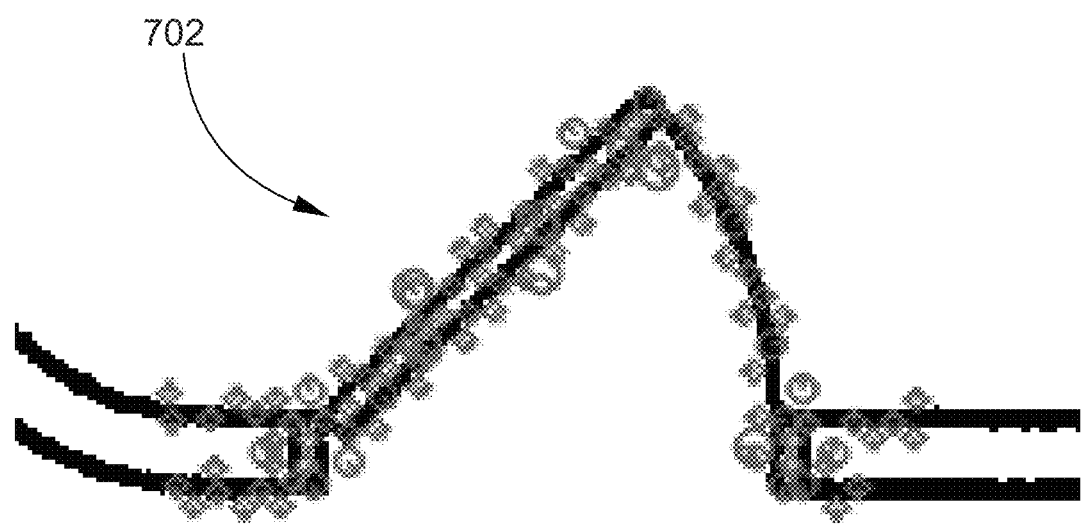
FIG. 8 is a diagram illustrating potential key points detected in a confirmed room denoting open space with an AKAZE algorithm according to an embodiment of the present disclosure.
Figure 9:
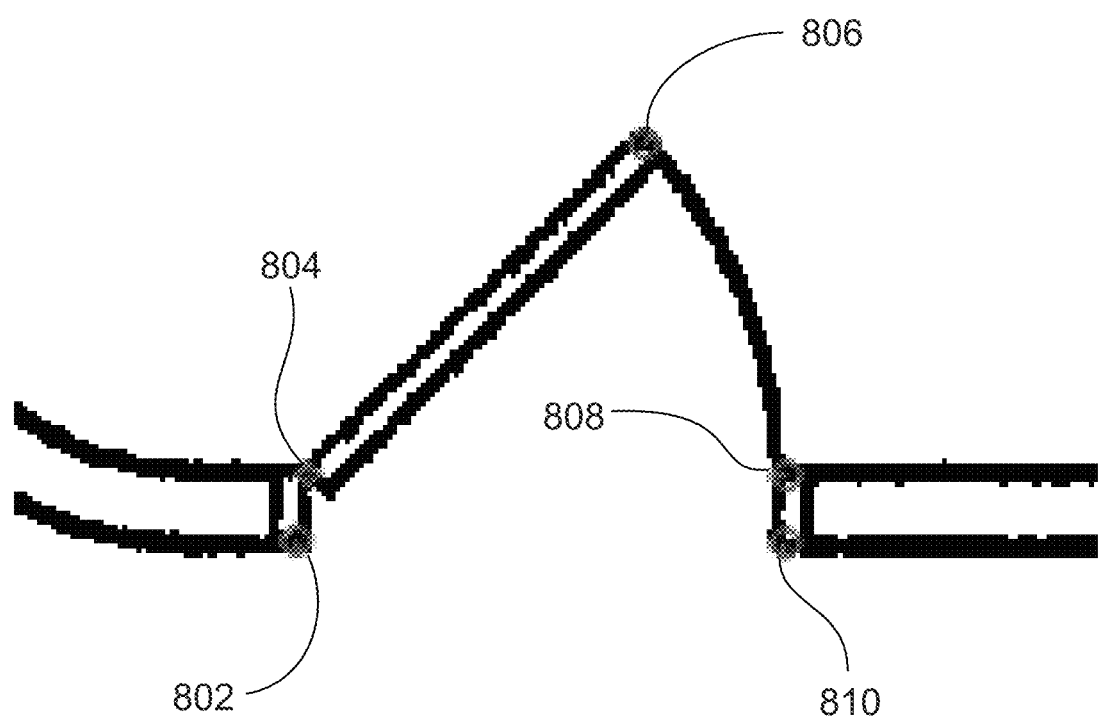
FIG. 9 is a diagram showing key points isolated from a set of potential key points detected in a confirmed room denoting open space with an AKAZE algorithm using a training set and associated algorithm according to an embodiment of the present disclosure.
Figure 11:
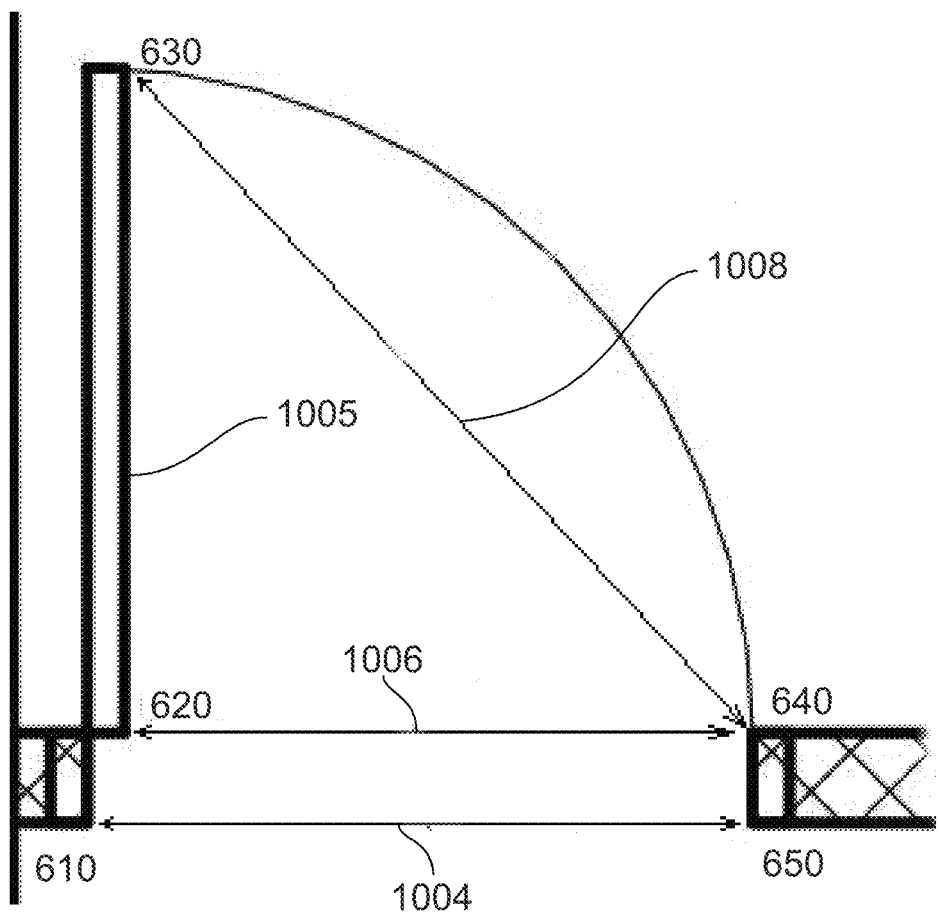
FIG. 11 is a diagram illustrating a portion of the validation descriptor according to an embodiment of the present disclosure.

Referring to FIG. 8, 702 represents feature descriptors generated by a perimeter break feature detection algorithm. A hamming distance metric value may be computed between each generated feature descriptor and known descriptors for each key point generated during program training. The image descriptors with the smallest hamming distance metric values, when compared to the known key point descriptors generated during training, are designated as potential key points 110. The result of such a computation with 806, 802, 804, 808, and 810 representing potential key points is shown in FIG. 9. Then, validation descriptors representing the entire potential room denoting perimeter break, in an embodiment tailored for room recognition, are generated 112. Each validation descriptor includes the distances between different potential key points generated from the image descriptors. FIG. 11 outlines one possible validation descriptor embodiment. In this embodiment, the Euclidian distance between doorway key points is calculated. As shown in FIG. 11, four distances are calculated: the distance between key points 610 and 650 labeled 1004; the distance between key points 620 and 630 labeled 1005; the distance between key points 620 and 640 labeled 1006; and the distance between 630 and 640 labeled 1008. As would be obvious to one of ordinary skill in the art, various other combinations of distances could be included. For example, the distances between points 610 and 620; points 610 and 640, and 620 and 650 could be calculated and included along with the distances described earlier. The generated validation descriptors could be compared using discriminative classifiers generated from a training set using a Support Vector Machine (SVM) algorithm. The key points associated with the best validation descriptors, according to the response from the classifier, may also be chosen, however using the validation descriptor to choose the best and single set of key points is highly preferred 114.

Figure 10:
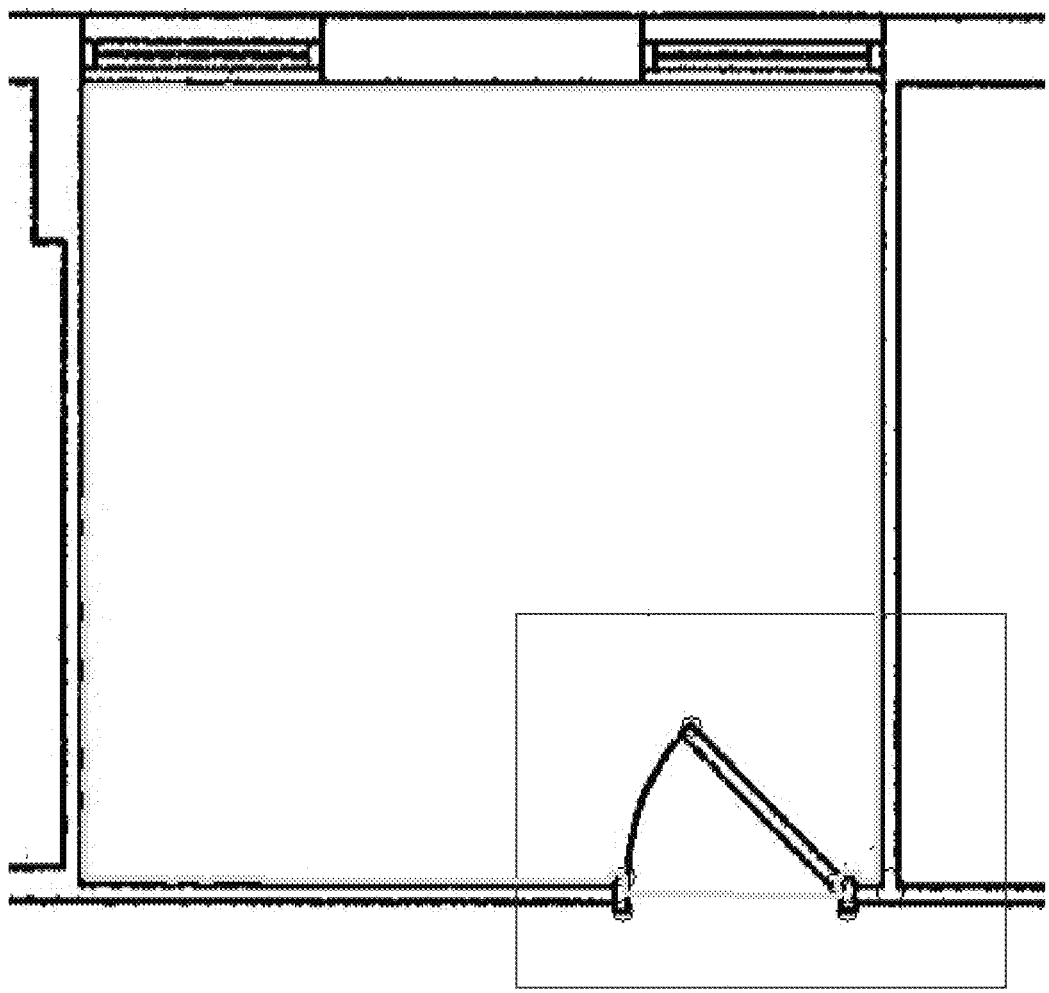
FIG. 10 is a diagram illustrating a defined room ready to be used in further calculations according to an embodiment of the present disclosure.

Once all the preceding steps have been completed, in an embodiment tailored for room recognition, the room can be defined. Turning to figure seven, the room may extend to the middle of the casing which may be defined as an imaginary straight line connecting the midpoints of and perpendicular to the straight lines connecting points 610 and 620 and 640 and 650 respectively. Point 630 may be used to indicate the door opening direction. The points of the room region path that are closest to the points of the identified doorway can be removed and joined with the points of the identified doorway. The result of defining a room once doorway key points are identified and points of the room region path that are closest to the points of the identified doorway are removed and joined with the points of the identified doorway which is ready to be used in further calculations is shown in FIG. 10.

Figure 12:
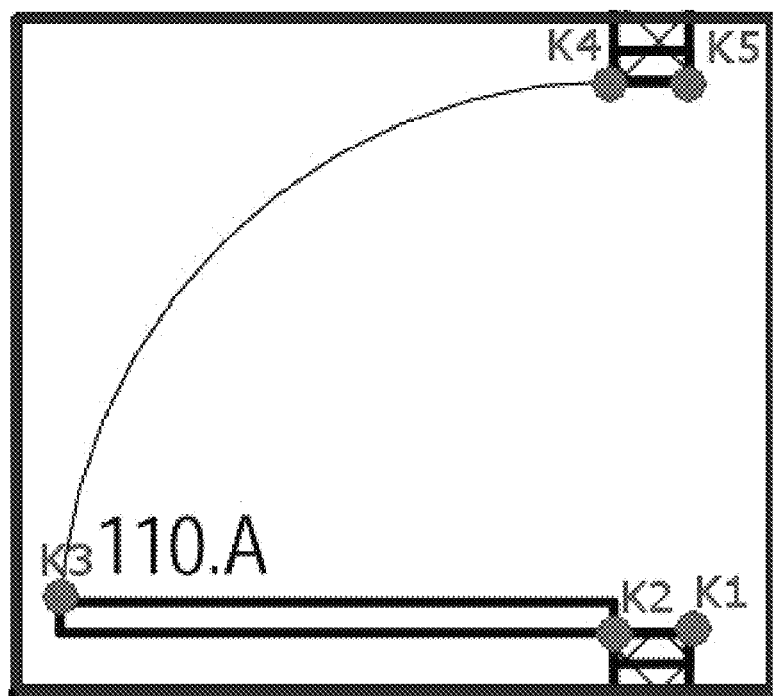
FIG. 12 is a diagram illustrating a human marked training computer image according to an embodiment of the present disclosure.

Before the bag of words algorithm, the clustering algorithm, the feature detection algorithm, and the doorway validation algorithm can be used successfully the bag of words algorithm, the clustering algorithm, the feature detection algorithm, and the doorway validation algorithm could be trained on real world data. First, as shown in FIG. 12, each doorway symbol may be outlined and each key point on each doorway could be marked. The bag of words algorithm may be trained by having the scanning window pass through the marked doorway area in a zig zag manner. As would be obvious to one with ordinary skill in the art, other scanning methods, such as separate horizontal and vertical scans may also be executed. Periodically, as the scanning window is moved through the doorway area, the closest doorway part may be determined and the computed image descriptor for this position along with the doorway part may be passed to the classifier.

Figure 13:
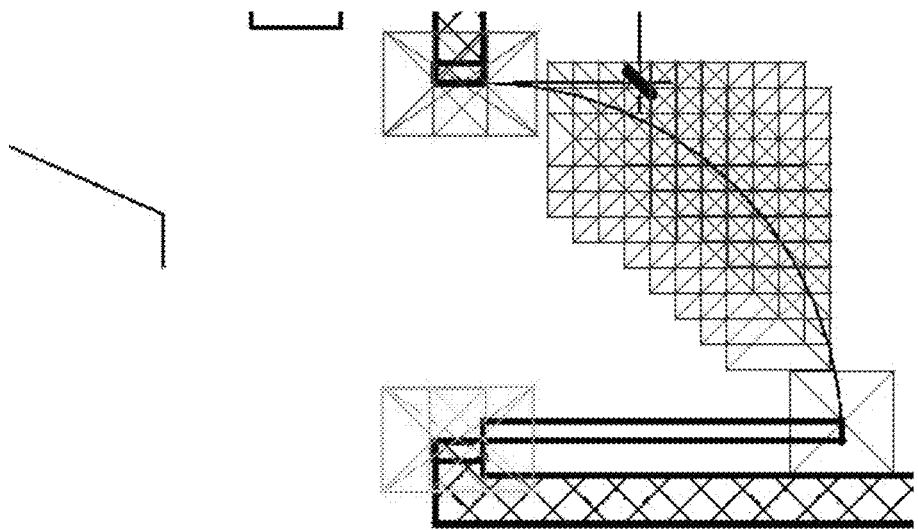
FIG. 13 is a diagram illustrating an example positive pair used in training the clustering algorithm according to an embodiment of the present disclosure.
Figure 13:
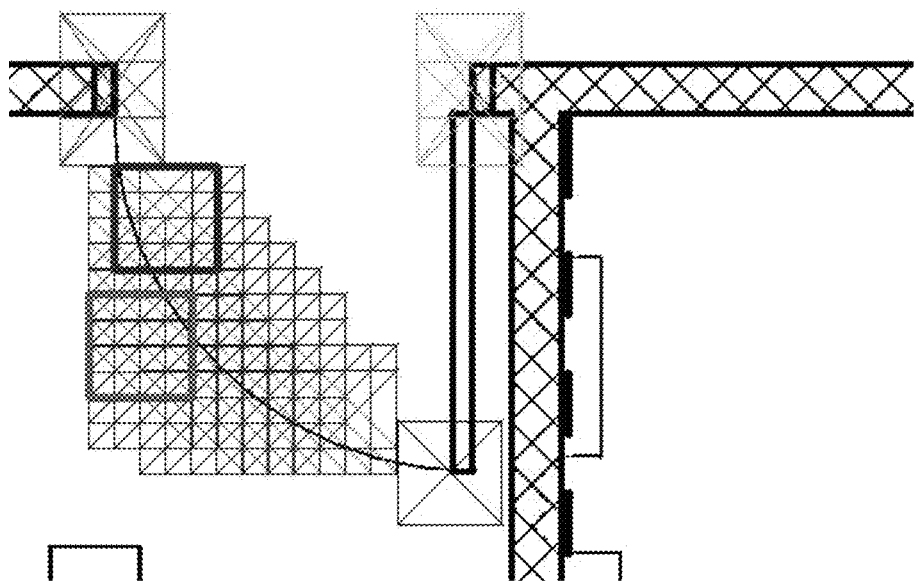
Figure 14:
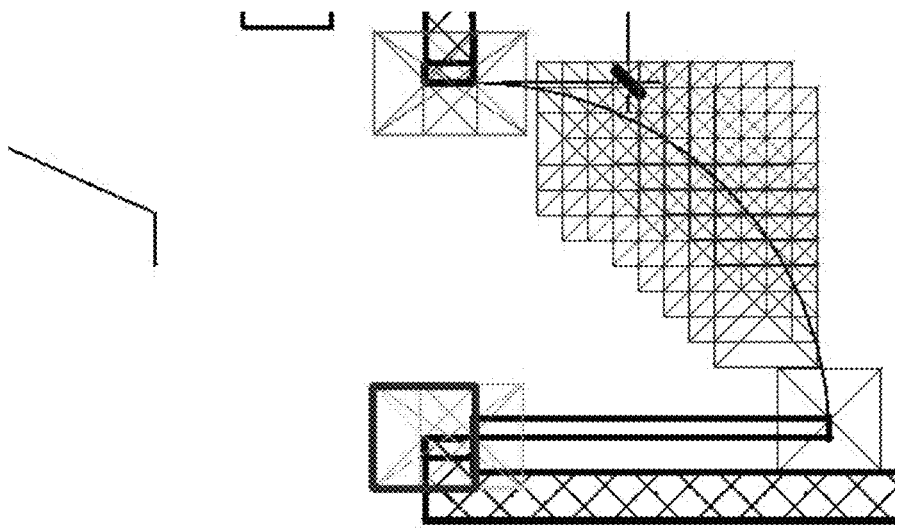
FIG. 14 is a diagram illustrating an example negative pair used in training the clustering algorithm according to an embodiment of the present disclosure.
Figure 14:
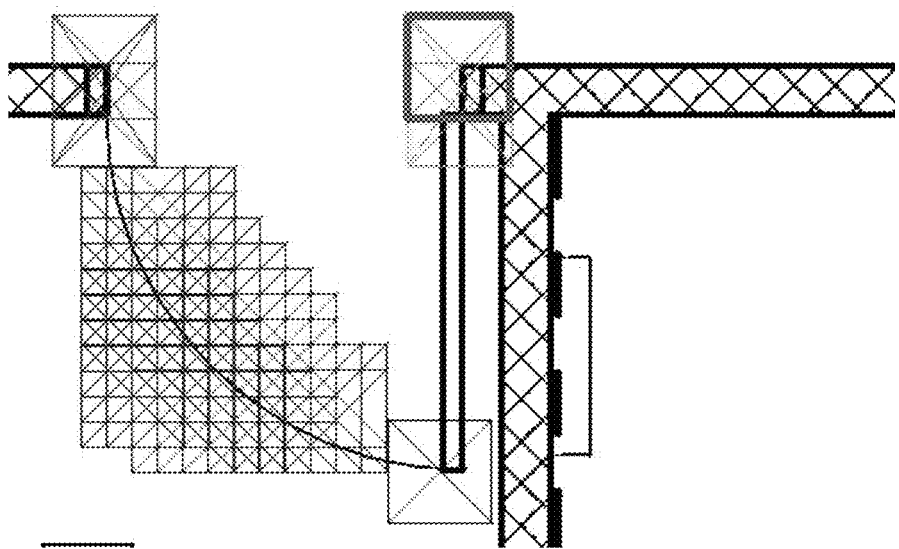

The clustering algorithm may be trained as illustrated in FIGS. 13 and 14. The positions and image descriptors used above may be combined into pairs. As shown in FIG. 14, two doors could be close enough together that key points from two different doors could be present in one scanning window. The two red and blue bold regions in FIG. 14 represent a negative pair. FIG. 13 illustrates a positive pair since the red and blue bold regions are located within the same doorway. Descriptors from all possible pairs along with the negative or positive pair label may be passed to the classifier.

Figure 15:
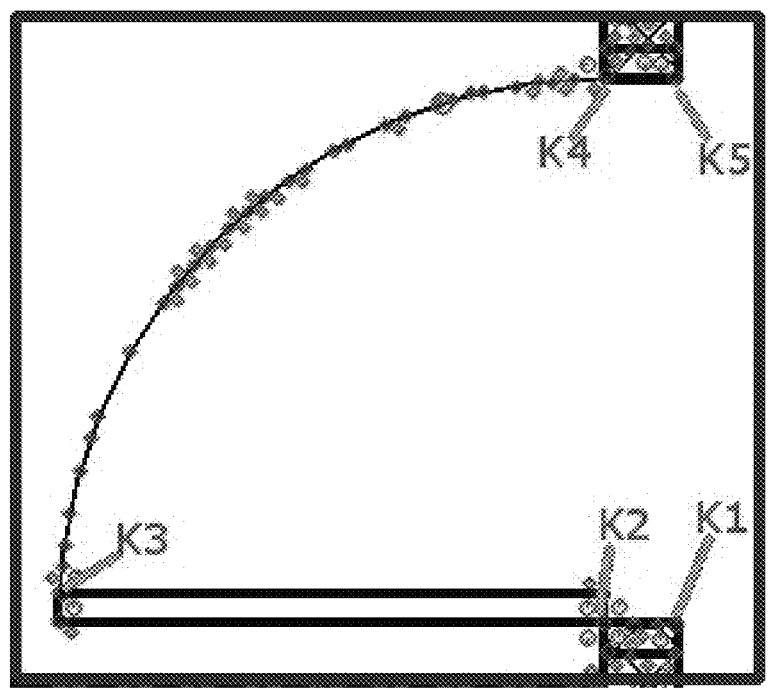
FIG. 15 is a diagram illustrating an example keypoint isolation used in training the feature detection algorithm according to an embodiment of the present disclosure.

The feature detection algorithm could be trained by having the algorithm detect all potential key points within the doorway area shown in FIG. 15. Key points located closest to the key points marked on the example computer image are noted and may be stored in memory. As shown in FIG. 14, K1, K2, K3, K4, and K5 represent key points located closest to the key points marked on the example computer image and so stored in memory. The validation algorithm may be trained by composing a descriptor using the key points located closest to the key points marked on the example computer image and so stored in memory. In one embodiment these would be descriptors composed from K1 K2 K3 K4 and K5 in FIG. 15. This may be passed to the classifier as a valid descriptor. Various descriptors may be composed from remaining key points and passed to the classifier as invalid descriptors.

Figure 16:
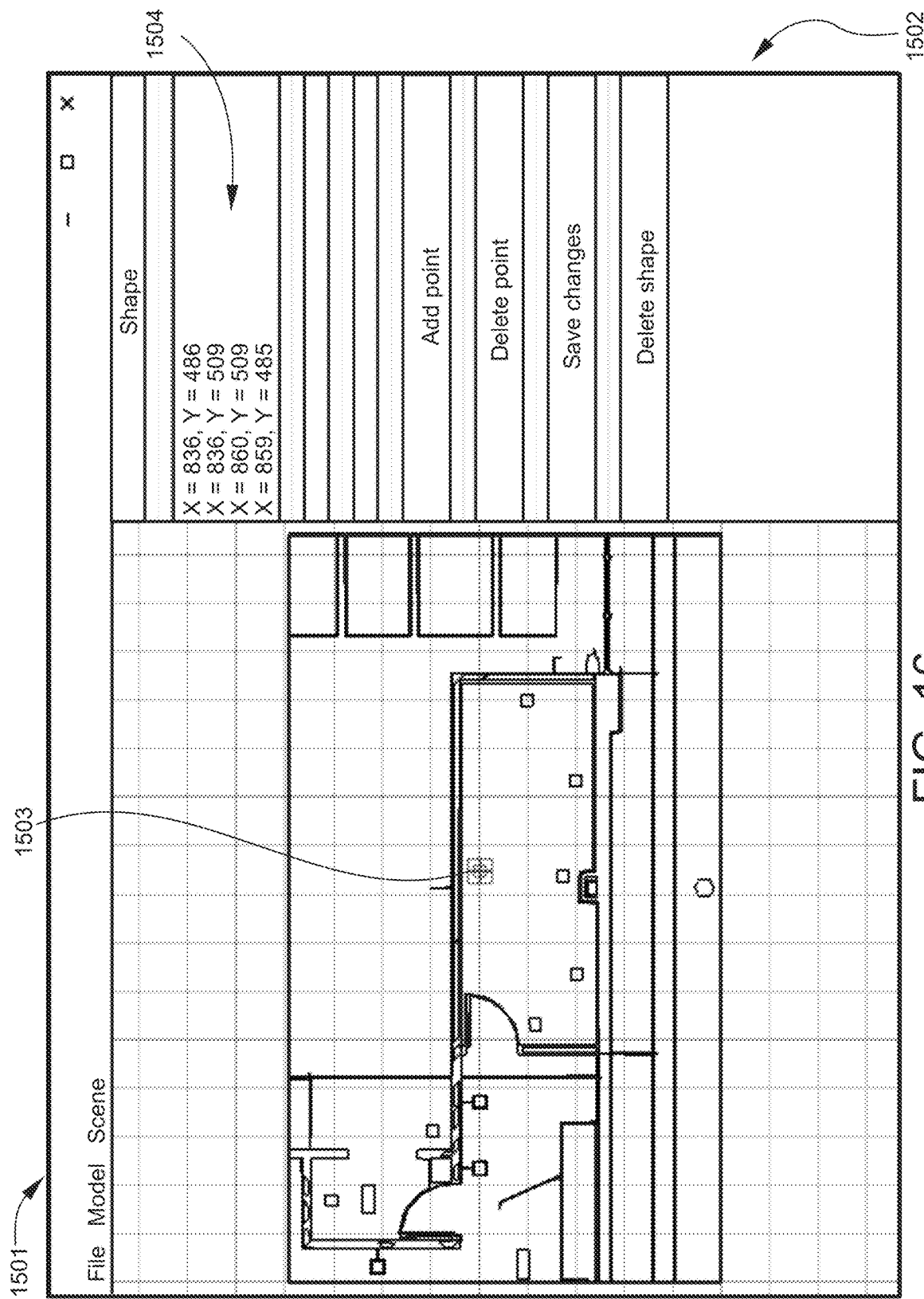
FIG. 16 is a diagram of the UI a user of the system might see according to an embodiment of the present disclosure.
Figure 17:
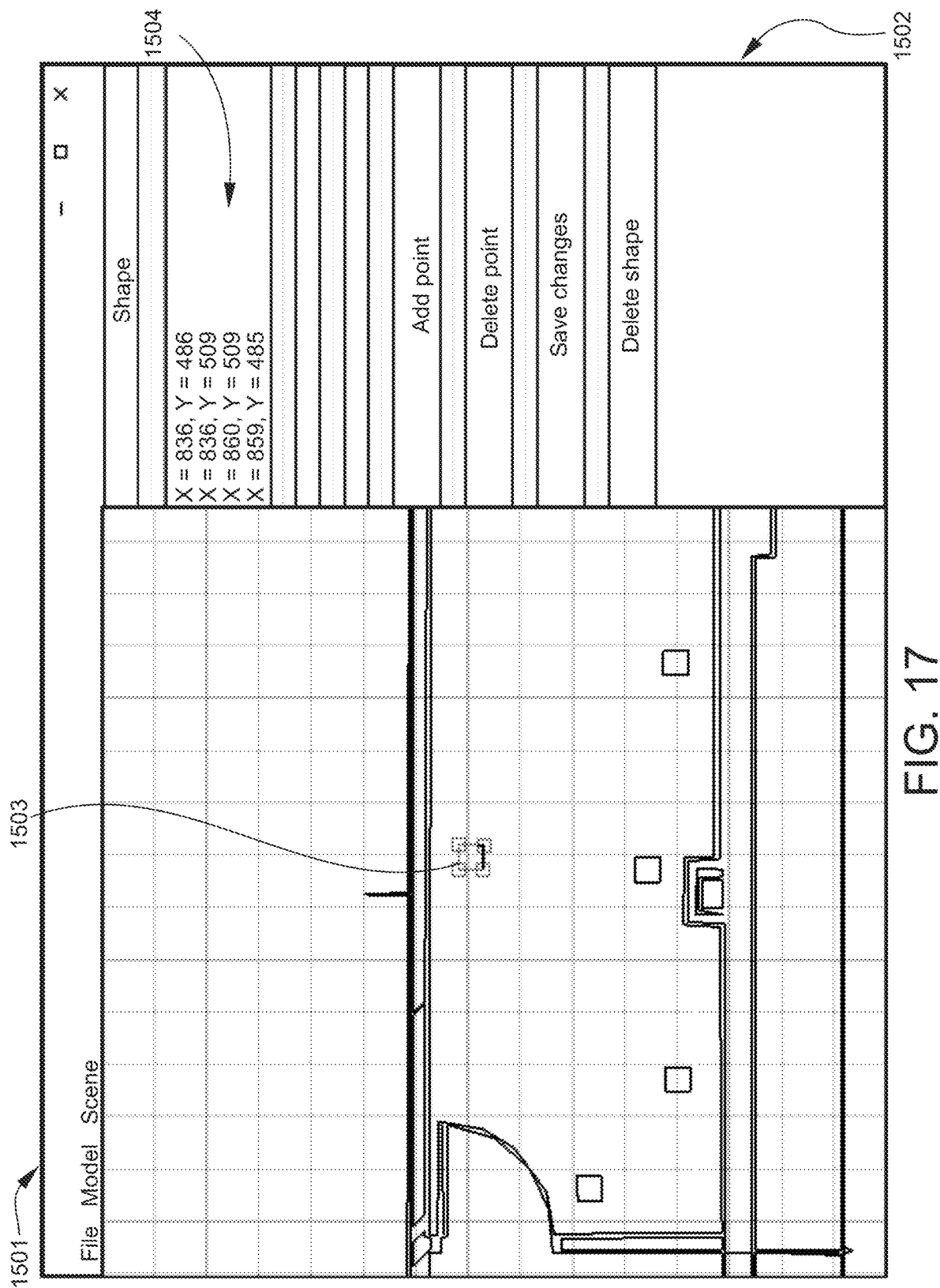
FIG. 17 is a diagram of the UI a user of the system might see according to an embodiment of the present disclosure.
Figure 18:
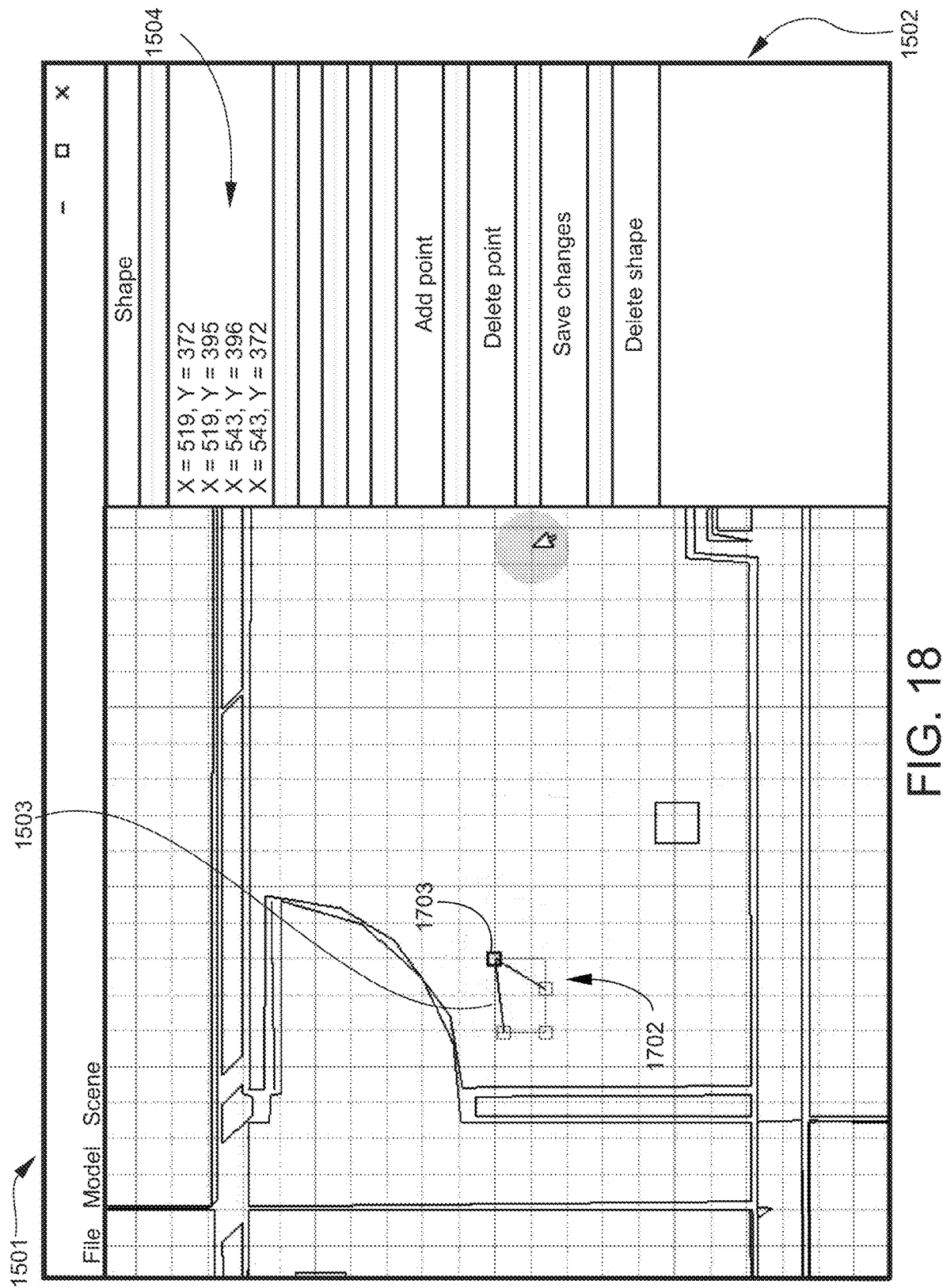
FIG. 18 is a diagram of the UI a user of the system might see according to an embodiment of the present disclosure.
Figure 19:
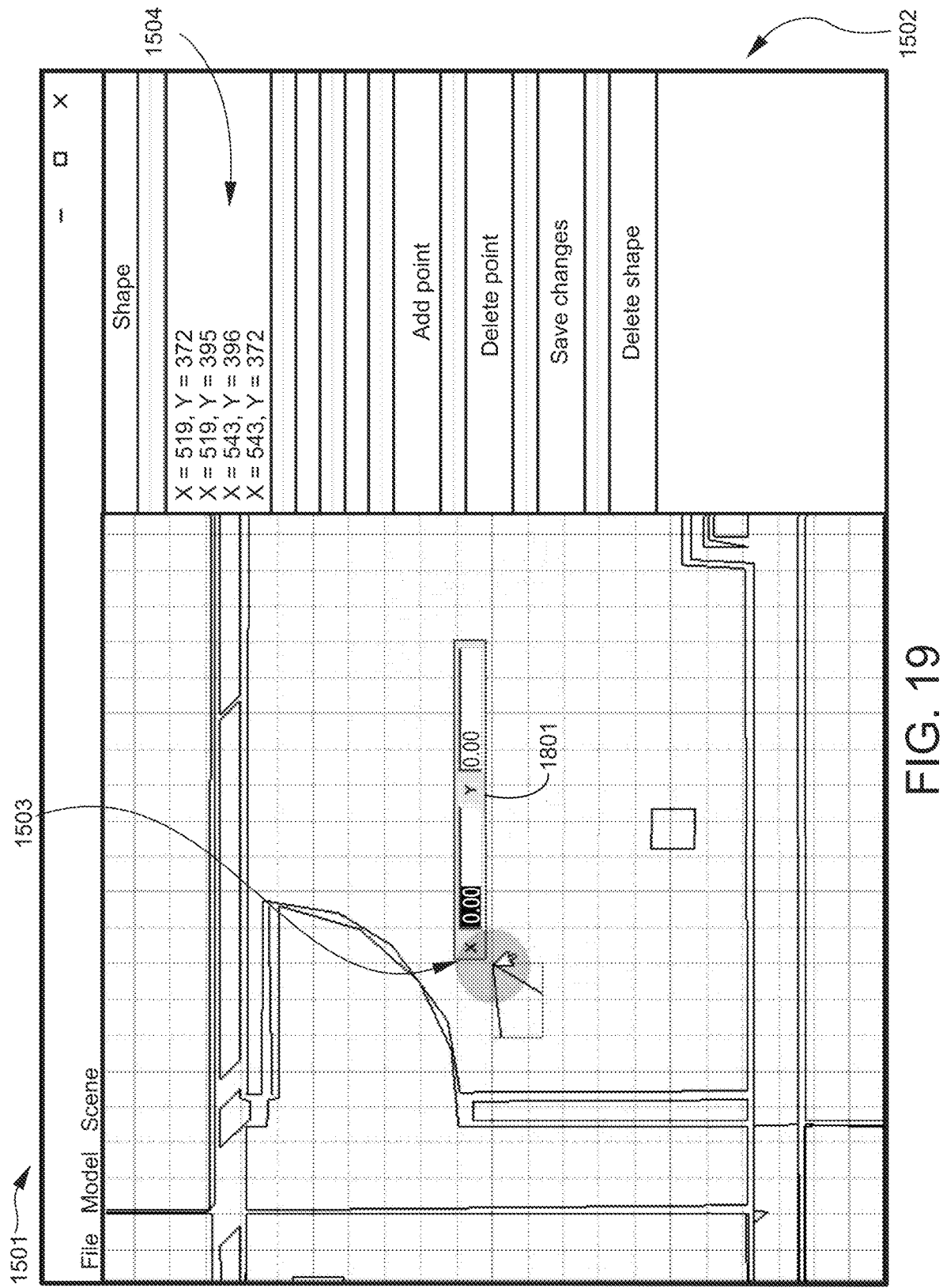
FIG. 19 is a diagram of the UI a user of the system might see according to an embodiment of the present disclosure.
Figure 20:
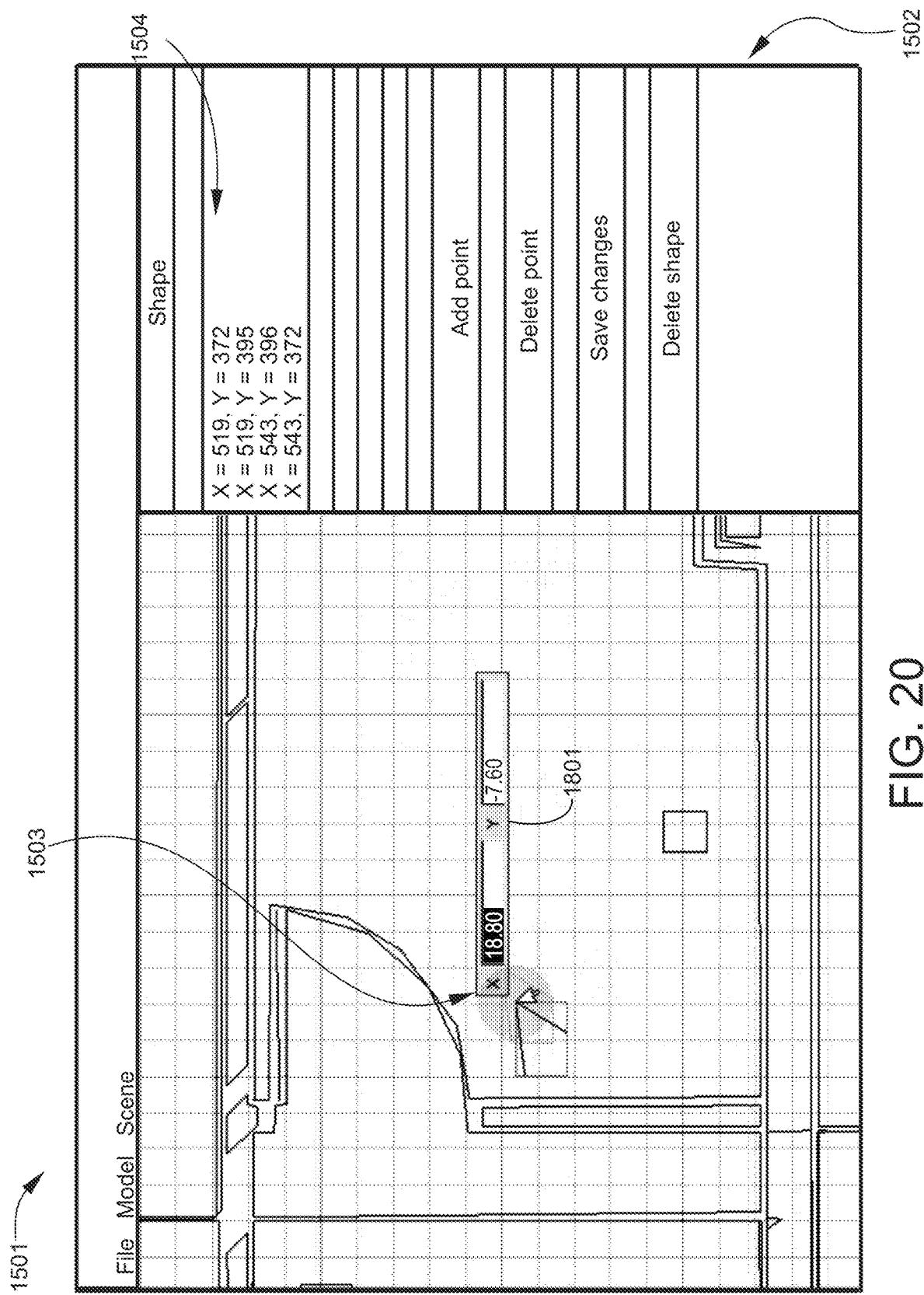
FIG. 20 is a diagram of the UI a user of the system might see according to an embodiment of the present disclosure.

FIG. 16 illustrates an example user interface of the present disclosure. According to FIG. 15 1501 may illustrate a preprocessed version of the imported image with aspects known not to represent repeating geometric units removed. Buttons that the user may use to edit this preprocessed image are represented by 1502. A point selection interface that can be used to select points for editing is shown in 1503. Cartesian coordinates are represented by 1504. According to FIG. 17, 1601 represents a view of the preprocessed image panned, rotated, or zoomed by the user. According to FIG. 18 1701 and 1702 represent points selected and dragged by the user to change the shape of the figure at that location. According to FIG. 19 1801 represents Cartesian coordinates related to a selection made by the user. According to FIG. 20 1801 represents Cartesian coordinates related to a selection made by the user.

In a preprocessing step, aspects known not to represent repeating geometric units are removed. At this point, a user of the system may see a GUI that may illustrate a preprocessed version of the imported image with aspects known not to represent repeating geometric units removed. In an alternate embodiment, the user may have the ability to edit this preprocessed image using buttons shown in 1502. An example point selection interface is shown in 1503. As would be obvious to those skilled in the art other graphical user elements, such as opaque geometric shapes, or arrows may be used.

In an alternate embodiment the user may pan, rotate, or zoom the preprocessed image 1501 and change the view of the preprocessed image 1601 as shown in FIG. 17. Once the user confirms the image, the system calculates the location of the rooms or other repeating geometric units. The system may also highlight the rooms as shown in FIG. 4.

In an embodiment, the user may be able to click on the corner 1701 of any location in the preprocessed image 1501 and drag to change the shape of an item 1702 at the selected location. In an alternate embodiment, the user may be able to select and move or delete shapes as well as add new ones to the preprocessed image 1501. Cartesian coordinates for various aspects of the image may be shown 1504. In an alternate embodiment, these coordinates could be calculated in reference to an origin at the center of the preprocessed image. In an alternate embodiment, the coordinates could be calculated in reference to an origin at the location of a selected area 1502 of the preprocessed image. In an alternate embodiment, the displayed Cartesian coordinates 1504 change when a location 1702 is selected in the preprocessed image 1501. In an alternate embodiment, the Cartesian coordinates related to a location 1702 selected in the preprocessed image 1501 may be displayed as a popup 1801 near the point selection interface 1503. In an alternate embodiment the popup Cartesian coordinates 1801 related to a location 1702 selected in the preprocessed image 1501 are calculated in reference to an origin at the center of the preprocessed image. In an alternate embodiment the popup Cartesian coordinates 1801 related to a location 1802 selected in the preprocessed image 1501 are calculated in reference to an origin at the location of a selected area 1702 of the preprocessed image 1501.

The various techniques described herein may be implemented with hardware or software or, where appropriate, with a combination of both. Thus, the methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the presently disclosed subject matter. In the case of program code execution on programmable computers, the computer can generally include a processor, a storage medium readable by the processor (including volatile and nonvolatile memory and/or storage elements), at least one input device and at least one output device. One or more programs may be implemented in a high level procedural or object oriented programming language to communicate with a computer system. However, the program(s) can be implemented in assembly or machine language, if desired. In any case, the language may be a compiled or interpreted language, and combined with hardware implementations.

The described methods and apparatus may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the presently disclosed subject matter. When implemented on a general-purpose processor, the program code combines with the processor to provide a unique apparatus that operates to perform the processing of the presently disclosed subject matter.

Features from one embodiment or aspect may be combined with features from any other embodiment or aspect in any appropriate combination. For example, any individual or collective features of method aspects or embodiments may be applied to apparatus, system, product, or component aspects of embodiments and vice versa.

While the embodiments have been described in connection with the various embodiments of the various figures, it is to be understood that other similar embodiments may be used or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed:

1. A method comprising:
   identifying potential repeating geometric units using a connected component labeling algorithm;
   selecting a repeating geometric unit among the identified potential repeating geometric units using a rule set based on sizes of the identified potential repeating geometric units;
   detecting key points in a perimeter of the selected repeating geometric unit;
   identifying features in the detected key points based on a pre-trained model of relative distances between verified key points;
   modifying the geometry of the repeating geometric unit based on the identified features; and
   measuring a size of the repeating geometric unit based on the modification of the repeating geometric unit.

2. The method of claim 1, wherein the connected component labeling algorithm uses a decision tree to reduce the number of neighboring pixels visited.

3. The method of claim 1, wherein the connected component labeling algorithm uses a compact representation of the union-find data structure to reduce computational time.

4. The method of claim 1, wherein the connected component includes structures that reside on an edge of the entire image, and
   wherein the method comprises removing the structures in an initial step.

5. The method of claim 1, wherein the connected component includes structures that overlap with larger components, and
   wherein the method further includes removing the structures in an initial step.

6. The method of claim 1, wherein the connected component includes structures of a size smaller than previously measured connected components, and
   wherein the method further includes removing the structures in an initial step.

7. The method of claim 1, wherein the connected component includes structures smaller than 1.5 times a user defined geometric unit defining perimeter break, and
   wherein the method further includes removing the structures in an initial step.

8. The method of claim 1, wherein detecting key points comprises moving a scanning window through the connected component.

9. The method of claim 8, further comprising using a bag of words algorithm to parts of a potential geometric unit defining break.

10. The method of claim 9, further comprising computing a hamming distance metric value between the parts of a potential geometric unit defining break and parts of a known geometric unit defining break.

11. A system comprising:
a processor and memory wherein the processor and memory are configured to:
identify potential repeating geometric units using a connected component labeling algorithm;
select a repeating geometric unit among the identified potential repeating geometric units using a rule set based on sizes of the identified potential repeating geometric units;
detect key points in a perimeter of the selected repeating geometric unit;
identify features in the detected key points based on a pre-trained model of relative distances between verified key points;
modify the geometry of the repeating geometric unit based on the identified features; and
measure a size of the repeating geometric unit based on the modification of the repeating geometric unit.

12. The system of claim 11, wherein the connected component labeling algorithm uses a decision tree to reduce the number of neighboring pixels visited.

13. The system of claim 11, wherein the connected component labeling algorithm uses a compact representation of the union-find data structure to reduce computational time.

14. The system of claim 11, wherein the connected component includes structures that reside on an edge of the entire image, and
wherein the processor and memory are configured to remove the structures in an initial step.

15. The system of claim 11, wherein the connected component includes structures that overlap with larger components, and
wherein the processor and memory are configured to remove the structures in an initial step.

16. The system of claim 11, wherein the connected component includes structures of a size smaller than previously measured connected components, and
wherein the processor and memory are configured to remove the structures in an initial step.

17. The system of claim 11, wherein the connected component includes structures smaller than 1.5 times a user defined geometric unit defining perimeter break, and
wherein the processor and memory are configured to remove the structures in an initial step.

18. The system of claim 11, wherein the processor and memory are configured to detect breaks in the perimeter of the repeating geometric unit by moving a scanning window through the connected component.

19. The system of claim 11, wherein wherein the processor and memory are configured to use a bag of words to detect parts of a potential geometric unit defining break.

20. A computer program product comprising a non-transitory computer readable storage medium having program instructions embodied therewith, the program instructions executable by a computing device to cause the computing device to:
identify potential repeating geometric units using a connected component labeling algorithm;
select a repeating geometric unit among the identified potential repeating geometric units using a rule set based on sizes of the identified potential repeating geometric units;
detect key points in a perimeter of the selected repeating geometric unit;
identify features in the detected key points based on a pre-trained model of relative distances between verified key points;
modify the geometry of the repeating geometric unit based on the identified features; and
measure a size of the repeating geometric unit based on the modification of the repeating geometric unit.

\* \* \* \* \*